United States Patent
Otomo et al.

(10) Patent No.: US 10,968,375 B2
(45) Date of Patent: Apr. 6, 2021

(54) SILICONE RUBBER COMPOSITION AND COMPOSITE MADE THEREFROM

(71) Applicant: Dow Corning Toray Co., Ltd., Tokyo (JP)

(72) Inventors: Takayoshi Otomo, Chiba (JP); Tomoko Tasaki, Chiba (JP)

(73) Assignee: DOW TORAY CO., LTD., Tokyo (JP)

( * ) Notice: Subject to any disclaimer, the term of this patent is extended or adjusted under 35 U.S.C. 154(b) by 209 days.

(21) Appl. No.: 16/311,235

(22) PCT Filed: Jun. 15, 2017

(86) PCT No.: PCT/JP2017/022058
§ 371 (c)(1),
(2) Date: Dec. 19, 2018

(87) PCT Pub. No.: WO2018/003511
PCT Pub. Date: Jan. 4, 2018

(65) Prior Publication Data
US 2019/0233692 A1 Aug. 1, 2019

(30) Foreign Application Priority Data
Jun. 29, 2016 (JP) .............................. JP2016-128653

(51) Int. Cl.
| | | |
|---|---|---|
| C08G 77/38 | (2006.01) | |
| C08G 77/04 | (2006.01) | |
| C08G 77/12 | (2006.01) | |
| C08G 77/20 | (2006.01) | |
| C08L 83/04 | (2006.01) | |
| C09J 183/10 | (2006.01) | |
| C09J 11/00 | (2006.01) | |
| C09J 4/06 | (2006.01) | |
| C08J 5/12 | (2006.01) | |
| C08G 77/00 | (2006.01) | |

(52) U.S. Cl.
CPC ............ *C09J 183/10* (2013.01); *C08J 5/128* (2013.01); *C08L 83/04* (2013.01); *C09J 4/06* (2013.01); *C09J 11/00* (2013.01); *C08G 77/12* (2013.01); *C08G 77/20* (2013.01); *C08G 77/80* (2013.01); *C08G 2125/00* (2013.01); *C08J 2367/00* (2013.01); *C08J 2369/00* (2013.01); *C08J 2377/00* (2013.01); *C08J 2483/10* (2013.01)

(58) Field of Classification Search
CPC ......... C08L 83/04; C08G 77/38; C08G 77/04; C08G 77/12; C08G 77/20; C08G 2125/00; C09J 183/04; C09J 183/10
See application file for complete search history.

(56) References Cited

U.S. PATENT DOCUMENTS

| | | | | |
|---|---|---|---|---|
| 4,980,413 A | * | 12/1990 | Kasuya | ............... C08F 283/128 524/265 |
| 5,248,715 A | | 9/1993 | Gray et al. | |
| 5,789,485 A | * | 8/1998 | Kobayashi | ........... C09D 183/04 427/387 |
| 6,274,658 B1 | * | 8/2001 | Hara | ...................... C08K 5/107 524/287 |
| 6,645,638 B2 | * | 11/2003 | Fujiki | ........................ C08J 5/12 428/331 |
| 2001/0004650 A1 | | 6/2001 | Tsuji et al. | |
| 2002/0032270 A1 | | 3/2002 | Azechi | |
| 2007/0100072 A1 | * | 5/2007 | Akitomo | ............. C08F 290/068 525/92 G |
| 2014/0179863 A1 | | 6/2014 | Kato | |
| 2014/0194019 A1 | * | 7/2014 | Greer | ...................... C09J 183/04 442/150 |
| 2015/0259585 A1 | * | 9/2015 | Tasaki | ..................... C09J 183/06 524/425 |
| 2016/0032060 A1 | * | 2/2016 | Jiang | ...................... C09J 183/06 427/387 |

FOREIGN PATENT DOCUMENTS

| | | |
|---|---|---|
| EP | 1006145 A1 | 6/2000 |
| EP | 1045006 A2 | 10/2000 |

(Continued)

OTHER PUBLICATIONS

PCT/JP2017/022058 International Search Report dated Aug. 8, 2017, 3 pages.
English language abstract and machine translation for JPH08120177 (A) extracted from http://worldwide.espacenet.com database on Nov. 29, 2018, 15 pages.
English language abstract and machine translation for JP2009185254 (A) extracted from http://worldwide.espacenet.com database on Nov. 29, 2018, 35 pages.
English language abstract and machine translation for JP2010215719 (A) extracted from http://worldwide.espacenet.com database on Nov. 29, 2018, 24 pages.
Machine assisted English translation of JP4771046B2 obtained https://patents.google.com from on Feb. 3, 2020, 10 pages.

*Primary Examiner* — Rip A Lee
(74) *Attorney, Agent, or Firm* — Warner Norcross + Judd LLP

(57) ABSTRACT

A silicone rubber composition comprises: (A) an organopolysiloxane having at least two alkenyl groups in a molecule and free of an aryl group; (B) (B-1) an organosiloxane having in a molecule at least one aryl group, at least one silicon-bonded hydrogen atom, and free of an alkenyl group, or a mixture of components (B-1) and (B-2) an organosiloxane having in a molecule at least one aryl group and at least one alkenyl group; (C) an acrylic compound or a methacrylic compound; (D) an organopolysiloxane having at least two silicon-bonded hydrogen atoms in a molecule and free of an aryl group and an alkenyl group; and (E) a hydrosilylation reaction catalyst. The silicone rubber composition exhibits excellent adhesive properties with respect to diverse organic resins it comes into contact with during its cure, and at the same time possesses excellent mold-release properties with respect to metal dies used for its molding.

14 Claims, No Drawings

(56) References Cited

FOREIGN PATENT DOCUMENTS

| JP | H08120177 | 5/1996 |
|---|---|---|
| JP | 2009185254 | 8/2009 |
| JP | 2010215719 | 9/2010 |
| JP | 4771046 B2 | 9/2011 |

* cited by examiner

SILICONE RUBBER COMPOSITION AND COMPOSITE MADE THEREFROM

CROSS-REFERENCE TO RELATED APPLICATIONS

This application is the National Stage of International Application No. PCT/JP2017/022058 filed on 15 Jun. 2017, which claims priority to and all advantages of Japanese Patent Appl. No. 2016-128653 filed on 29 Jun. 2016, the content of which is hereby incorporated by reference.

TECHNICAL FIELD

The present invention relates to a silicone rubber composition and a composite made from the silicone rubber composition.

BACKGROUND ART

Silicone rubber compositions which have adhesive properties with respect to organic resins they come into contact with during their cure, and which at the same time possess mold-release properties with respect to metal dies used for their molding, are known. For example, U.S. Patent Application Publication No. 2002/0032270 discloses a silicone rubber composition comprising: a heat curable organopolysiloxane composition; reinforcing silica fines; an adhesive agent; and an organosilicon compound having a functional group reactive with the heat curable organopolysiloxane composition and a siloxane skeleton incompatible with the heat curable organopolysiloxane composition, and U.S. Patent Application Publication No. 2007/0100072 discloses a silicone rubber composition comprising: an organopolysiloxane having at least two silicon-bonded alkenyl groups in a molecule; an organohydrogenpolysiloxane having at least two silicon-bonded hydrogen atoms in a molecule; an alkylene glycol ester of diacrylic acid or an alkylene glycol ester of dimethacrylic acid; and a hydrosilylation reaction catalyst.

However, because the former silicone rubber composition forms a silicone rubber with a defective appearance, it is limited in use. And, the former silicone rubber composition does not exhibit satisfactory adhesive properties with respect to diverse organic resins it comes into contact with during it cures. Furthermore, the latter silicone rubber composition does not exhibit satisfactory adhesive properties with respect to diverse organic resins it comes into contact with during it cures, while at the same time does not possess satisfactory mold-release properties with respect to metal dies used for its molding.

CITATION LIST

Patent Literature

Patent Document 1: US Patent Application Publication No. 2002/0032270
Patent Document 2: US Patent Application Publication No. 2007/0100072

SUMMARY OF INVENTION

Technical Problem

An object of the present invention is to provide a silicone rubber composition which exhibits excellent adhesive properties with respect to diverse organic resins it comes into contact with during its cure, and which at the same time possesses excellent mold-release properties with respect to metal dies used for its molding. Another object of the present invention is to provide a composite in which a silicone rubber adheres to at least one organic resin sufficiently.

Solution to Problem

The silicone rubber composition of the present invention comprises:
(A) 100 parts by mass of an organopolysiloxane having at least two alkenyl groups in a molecule and free of an aryl group;
(B) 0.1 to 5 parts by mass of (B-1) an organosiloxane having in a molecule at least one aryl group and at least one silicon-bonded hydrogen atom, and free of an alkenyl group, or a mixture of component (B-1) and (B-2) an organosiloxane having in a molecule at least one aryl group and at least one alkenyl group;
(C) 0.1 to 5 parts by mass of an acrylic compound or a methacrylic compound;
(D) an organopolysiloxane having at least two silicon-bonded hydrogen atoms in a molecule and free of an aryl group and an alkenyl group, in an amount such that the mole ratio of silicon-bonded hydrogen atoms per 1 mole of aliphatic unsaturated bonds in this composition is 0.5 to 5;
(E) a catalytically effective amount of a hydrosilylation reaction catalyst.

The composite of the present invention comprises a silicone rubber cured from the silicone rubber composition of the present invention and at least one organic resin, wherein the silicone rubber adheres to said organic resin.

Effects of Invention

The silicone rubber composition of the present invention is characterized by exhibiting excellent adhesive properties with respect to diverse organic resins it comes into contact with during its cure, and at the same time possessing excellent mold-release properties with respect to metal dies used for its molding. And the composite of the present invention is characterized by exhibiting good adhesion of silicone rubber to diverse organic resins.

DETAILED DESCRIPTION OF THE INVENTION

Component (A) is an organopolysiloxane having at least two alkenyl groups in a molecule and free of an aryl group. Examples of the alkenyl groups in component (A) include alkenyl groups having from 2 to 12 carbons such as vinyl groups, allyl groups, butenyl groups, pentenyl groups, hexenyl groups, heptenyl groups, octenyl groups, nonenyl groups, decenyl groups, undecenyl groups, and dodecenyl groups, and vinyl groups are preferable. Examples of groups bonding to a silicon atom other than alkenyl groups in component (A) include alkyl groups having from 1 to 12 carbons such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, or bromine atoms. The silicon atoms in component (A) may also have small quantities of hydroxyl groups within a range that does not impair the object of the present invention.

No particular limitation is placed on the molecular structure of component (A), and this structure may be, for example, straight-chain, partially branched straight-chain, branched chain, cyclic, or three-dimensional net-like. Component (A) may be a single organopolysiloxane having these molecular structures or a mixture of two or more types of organopolysiloxane having these molecular structures. Examples of such component (A) include dimethylpolysiloxanes capped at both molecular terminals with dimethylvinylsiloxy groups, dimethylsiloxane-methylvinylsiloxane copolymers capped at both molecular terminals with dimethylvinylsiloxy groups, dimethylsiloxane-methylvinylsiloxane copolymers capped at both molecular terminals with trimethylsiloxy groups, copolymers consisting of $(CH_3)_3SiO_{1/2}$ units, $(CH_3)_2(CH_2{=}CH)SiO_{1/2}$ units, and $SiO_{4/2}$ units, copolymers consisting of $(CH_3)_2(CH_2{=}CH)SiO_{1/2}$ units and $SiO_{4/2}$ units, and mixtures of two or more types thereof.

Viscosity at 25° C. of component (A) is not limited, but it is typically in a range from 100 to 100,000 mPa·s. This is because when the viscosity is greater than or equal to the lower limit of the range described above, the composition forms a silicone rubber exhibiting good mechanical property, and when the viscosity is less than or equal to the upper limit of the range described above, the composition is easy to handle. The viscosity may be determined by measurement using a B-type viscometer in accordance with JIS K 7117-1.

Component (B) is an organosiloxane for increasing adhesion property of obtained silicone rubber, and is component (B-1) or a mixture of components (B-1) and (B-2).

Component (B-1) is an organosiloxane having in a molecule at least one aryl group and at least one silicon-bonded hydrogen atom, and free of alkenyl group. Examples of the aryl groups in component (B-1) include aryl groups having from 6 to 12 carbons such as phenyl groups, tolyl groups, xylyl groups, and naphthyl groups, and phenyl groups are preferable. Examples of groups bonding to a silicon atom other than aryl groups in component (B-1) include alkyl groups having from 1 to 12 carbons such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, or bromine atoms. The silicon atoms in component (B-1) may also have small quantities of hydroxyl groups within a range that does not impair the object of the present invention.

No particular limitation is placed on the molecular structure of component (B-1), but it is preferably an organosiloxane represented by the following general formula 1:

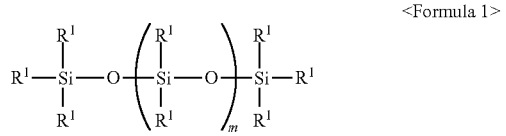

<Formula 1>

In the formula 1, each $R^1$ is independently a hydrogen atom, an alkyl group with 1 to 12 carbons or an aryl group with 6 to 12 carbons. Examples of the alkyl group include the same groups described above. Examples of the aryl group include the same groups described above. However, in the formula 1, at least one $R^1$ is hydrogen atoms, and typically at least two $R^1$ are hydrogen atoms. Furthermore, in the formula 1, at least one $R^1$ is the aryl group.

In the formula 1, "m" is an integer of 1 to 20, alternatively an integer of 1 to 10, or alternatively an integer of 1 to 5. This is because when "m" is within the aforementioned range, the composition forms a silicone rubber exhibiting proper adhesion to organic resins.

Component (B-2) is an organosiloxane having in a molecule at least one aryl group and at least one alkenyl group. Examples of the aryl groups in component (B-2) include aryl groups having from 6 to 12 carbons such as phenyl groups, tolyl groups, xylyl groups, and naphthyl groups, and phenyl groups are preferable. Examples of the alkenyl groups in component (B-2) include alkenyl groups having from 2 to 12 carbons such as vinyl groups, allyl groups, butenyl groups, pentenyl groups, hexenyl groups, heptenyl groups, octenyl groups, nonenyl groups, decenyl groups, undecenyl groups, and dodecenyl groups, and vinyl groups are preferable. Examples of groups bonding to a silicon atom other than aryl groups and alkenyl groups in component (B-2) include alkyl groups having from 1 to 12 carbons such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, or bromine atoms. The silicon atoms in component (B-2) may also have small quantities of hydroxyl groups within a range that does not impair the object of the present invention.

No particular limitation is placed on the molecular structure of component (B-2), but it is typically represented by the following general formula 2:

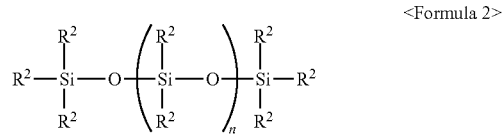

<Formula 2>

In the formula 2, each $R^2$ is independently an alkenyl group with 2 to 12 carbons, an alkyl group with 1 to 12 carbons or an aryl group with 6 to 12 carbons. Examples of the alkenyl group include the same groups described above. Examples of the alkyl group include the same groups described above. Examples of the aryl group include the same groups described above. However, in the formula 2, at least one $R^2$ is the alkenyl group, alternatively at least two $R^2$ are the alkenyl groups. Furthermore, in the formula 2, at least one $R^2$ is the aryl group.

In the formula 2, "n" is an integer of 0 to 20, alternatively an integer of 0 to 10, or alternatively an integer of 0 to 5. This is because when "n" is less than or equal to the upper limit of the range described above, the composition forms a silicone rubber exhibiting proper adhesion to organic resins.

Component (B) is typically a mixture of components (B-1) and (B-2). In this case, the mass ration of component (B-1):component (B-2) is not limited, but it is typically in a range of from 1:10 to 10:1, or alternatively in a range of from 1:5 to 5:1. This is because when the mass ratio is within the aforementioned range, the composition forms a silicone rubber exhibiting excellent adhesion to diverse organic resins.

Component (B) is used in an amount of from 0.1 to 5 parts by mass, alternatively from 0.5 to 5 parts by mass, or alternatively from 1 to 5 parts by mass, per 100 parts by mass of component (A). This is because when the content of component (B) is greater than or equal to the lower limit of the range described above, the composition forms a silicone rubber exhibiting good adhesion to diverse organic resins, and when the content is less than or equal to the upper limit of the range described above, the composition forms a silicone rubber exhibiting proper mechanical strength.

Component (C) is an acrylic compound or a methacrylic compound for increasing the adhesion property of the obtained silicone rubber. Component (C) is not limited, but it is typically the acrylic compound or the methacrylic compound selected from compounds represented by the following general formulae 3, 4, 5 and/or 6:

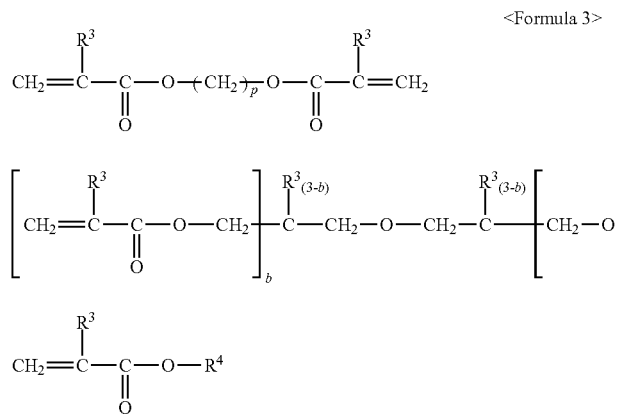

<Formula 3>

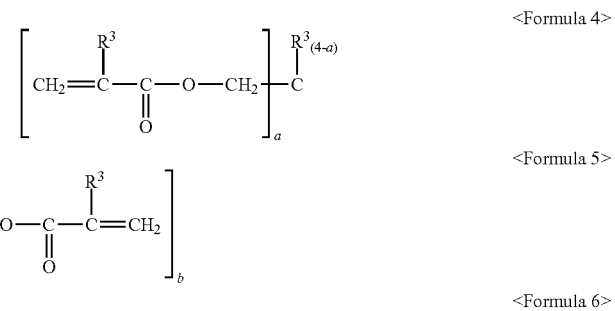

<Formula 4>

<Formula 5>

<Formula 6>

In the formulae 3, 4, 5 and/or 6, each $R^3$ is independently a hydrogen atom or a methyl group, and hydrogen atoms are preferable.

In the formula 6, $R^4$ is an aralkyl group with 7 to 20 carbons, an phenoxyalkyl group, or a phenoxyhydroxyalkyl group. Examples of the aralkyl groups in component (C) include benzyl groups, phenethyl groups, and phenyl propyl groups. Examples of the phenoxyalkyl groups in component (C) include phenoxyethyl groups and phenoxypropyl groups. Examples of the phenoxyhydroxyalkyl groups in component (C) include phenoxyhydoroxypropyl groups.

In the formula 4, "a" is an integer of 1 to 4, alternatively an integer of 2 to 4, or alternatively an integer of 3 to 4.

In the formula 5, each "b" is independently an integer of 1 to 3, alternatively an integer of 2 to 3.

In the formula 3, "p" is an integer of 4 to 12, alternatively an integer of 1 to 10, alternatively an integer of 6 to 12, or alternatively an integer of 6 to 10.

Component (C) is used in an amount of from 0.1 to 5 parts by mass, preferably from 0.5 to 5 parts by mass, or from 1 to 5 parts by mass, per 100 parts by mass of component (A). This is because when the content of component (C) is greater than or equal to the lower limit of the range described above, the composition forms a silicone rubber exhibiting good adhesion to diverse organic resins, and when the content is less than or equal to the upper limit of the range described above, the composition forms a silicone rubber exhibiting proper mechanical strength.

Component (D) is a crosslinking agent of the present composition and is an organohydrogenpolysiloxane having at least two silicon-bonded hydrogen atoms in a molecule and free of an aryl group and an alkenyl group. Examples of groups bonding to silicon atoms other than hydrogen atoms in component (D) include alkyl groups having from 1 to 12 carbon atoms such as methyl groups, ethyl groups, propyl groups, isopropyl groups, butyl groups, isobutyl groups, tert-butyl groups, pentyl groups, neopentyl groups, hexyl groups, cyclohexyl groups, heptyl groups, octyl groups, nonyl groups, decyl groups, undecyl groups, and dodecyl groups; and groups in which some or all of the hydrogen atoms of these alkyl groups are substituted with halogen atoms such as fluorine atoms, chlorine atoms, bromine atoms or mixture thereof. Furthermore, the silicon atoms in component (D) may have small amounts of hydroxyl groups within a range that does not impair the object of the present invention.

Examples of the molecular structure of component (D) include straight-chain, partially branched straight-chain, branched chain, cyclic, and three-dimensional reticular structures, and the molecular structure is preferably a partially branched straight-chain, branched chain, or three-dimensional reticular structure.

Viscosity at 25° C. of component (D) is not limited, but it is typically at most 10,000 mPa·s, alternatively in the range of from 1 to 5,000 mPa·s, or alternatively in the range of from 1 to 1,000 mPa·s. This is because when the viscosity is greater than or equal to the lower limit of the range described above, the composition forms a silicone rubber exhibiting good mechanical property, and when the viscosity is less than or equal to the upper limit of the range described above, the composition is easy to handle. This viscosity may, for example, be determined by measurement using a B-type viscometer in accordance with JIS K 7117-1.

Examples of such component (D) include 1,1,3,3-tetramethyldisiloxane, 1,3,5,7-tetramethylcyclotetrasiloxane, methylhydrogenpolysiloxanes capped at both molecular terminals with trimethylsiloxy groups, dimethylsiloxane-methylhydrogensiloxane copolymers capped at both molecular terminals with trimethylsiloxy groups, dimethylsiloxane-methylhydrogensiloxane copolymers capped at both molecular terminals with dimethylhydrogensiloxy groups, copolymers consisting of $(CH_3)_2HSiO_{1/2}$ units and $SiO_{4/2}$ units, copolymers consisting of $(CH_3)_2HSiO_{1/2}$ units, $SiO_{4/2}$ units, and $(C_6H_5)SiO_{3/2}$ units, and mixtures of two or more types thereof.

Component (D) is used in the amount such that a molar ratio of silicon-bonded hydrogen atoms per 1 mole of total aliphatic unsaturated bonds such as the alkenyl groups in component (A), the alkenyl groups in component (B), the aliphatic unsaturated bonds in component (C), or the like, in this composition is in a range from 0.5 to 5, alternatively in a range of from 0.8 to 2.5. This is because when the content of component (D) is greater than or equal to the lower limit of the range described above, the composition forms a silicone rubber exhibiting good adhesion to diverse organic resins, and when the content is less than or equal to the upper limit of the range described above, the composition forms a silicone rubber exhibiting proper mechanical strength. Here, the content of the silicon-bonded hydrogen atom in component (D) can be determined by analytical methods such as a Fourier transform infrared spectrophotometer (FT-IR), nuclear magnetic resonance (NMR), or gel permeation chromatography (GPC), for example.

Component (E) is a hydrosilylation reaction catalyst for accelerating the curing of this composition, and examples include platinum-based catalysts, rhodium-based catalysts, and palladium-based catalysts. Particularly, component (E) is typically a platinum-based catalyst so that the curing of the present composition can be dramatically accelerated. Examples of the platinum-based catalyst include a platinum fine powder, chloroplatinic acid, an alcohol solution of chloroplatinic acid, a platinum-alkenylsiloxane complex, a platinum-olefin complex, and a platinum-carbonyl complex, with a platinum-alkenylsiloxane complex being preferred.

In this composition, the content of component (E) is a catalytically effective amount and is not particularly limited as long as it is an amount that is effective for accelerating the curing of the composition, but the content is an amount such that the catalyst metal in component (E) is alternatively in the range from 1 to 1000 ppm, alternatively in the range from 1 to 500 ppm, or alternatively in the range from 1 to 300 ppm in mass units with respect to this composition. This is because when the content of component (E) is within the aforementioned range, the curing reaction of the resulting composition is accelerated.

The silicone rubber composition of the present invention may comprise a reaction inhibitor. The reaction inhibitors are exemplified by an alkyne alcohol such as 1-ethynyl-cyclohexan-1-ol, 2-methyl-3-butyn-2-ol, 3,5-dimethyl-1-hexyn-3-ol and 2-phenyl-3-butyn-2-ol; an en-yne compound such as 3-methyl-3-penten-1-yne and 3,5-dimethyl-3-hexen-1-yne; an alkenyl siloxane oligomer such as 1,3,5,7-tetramethyl-1,3,5,7-tetravinylcyclotetrasiloxane, 1,3,5,7-tetramethyl-1,3,5,7-tetrahexenylcyclotetrasiloxane; and other reaction inhibitors such as hydrazines, triazoles, phosphines, mercaptans, organic nitrogen compounds, acetylenic alcohols, silylated acetylenic alcohols, maleates, fumarates, ethylenically or aromatically unsaturated amides, ethylenically unsaturated isocyanates, olefinic silanes, olefinic siloxanes, unsaturated hydrocarbon monoesters and diesters, hydroperoxides, nitriles, and diaziridines. The content of the reaction inhibitor in this composition is not particularly limited, but it is typically in the range of 0.0001 to 5 parts by mass with respect to a total 100 parts by mass of components (A) to (D).

The silicone rubber composition of the present invention may comprise silica filler. Silica filler suitable for the present invention may have a specific surface area measured by BET method of at least 50 m$^2$/g up to 450 m$^2$/g. Examples of silica filler include precipitated silica (wet silica), fumed silica (dry silica), calcined silica, and the like. The silica filler may be surface-treated with an organohalosilane, organosilazane, organoalkoxysilane, or an organohydrogensiloxane. The content of silica filler in this composition is not particularly limited, but is typically in the range of from 5 to 40% by mass based on the total mass of this composition.

The silicone rubber composition of the present invention may comprise an organoalkoxysilane to further improve adhesion to organic resins. Examples of the organoalkoxysilane include vinyltrimethoxysilane, vinyltriethoxysilane, vinyltris (β-methoxyethoxy) silane, vinyldiethoxymethylsilane, allyltrimethoxysilane, acryloyloxymethyltrimethoxysilane, γ-methacryloyloxypropyltrimethoxysilane, γ-glycidyloxypropyltrimethoxysilane, γ-aminopropyltrimethoxysilane, γ-aminopropyltriethoxysilane, N-(β-aminoethyl)-γ-aminopropyltrimethoxysilane, γ-mercaptopropyltrimethoxysilane, α-(ethoxycarbonyl) ethyltrimethoxysilane. Those may be used independently, or more than two of those may be used. Particularly useful are γ-methacryloyloxypropyltrimethoxysilane and γ-glycidyloxypropyltrimethoxysilane. The content of the organoalkoxysilane is not limited, but it is typically in the range of from 0.01 to 20 parts by mass, or alternatively from 0.05 to 20 parts by mass, per 100 parts by mass of component (A).

The silicone rubber composition of the present invention is suitable to obtain integral mold with the organic resins.

The method of integral molding the silicone rubber composition onto the above organic resin is exemplified by (i) placing the silicone rubber composition which has desired shape on the organic resin, followed by heating at a temperature below the melting temperature of the organic resin; (ii) placing the silicone rubber composition on the organic resin, followed by compression molding at a temperature below the melting temperature of the organic resin; and (iii) previously injection molding the organic resin in a mold by means of an injection molding machine, and heat injecting the silicone rubber composition into the mold. The silicone rubber composition may be in a liquid state, putty like or paste, however, it is best useful to be liquid or paste to ease the molding. The curing conditions of the silicone rubber composition should be, for strong adhesion to the organic resin, at the temperature and time which do not cause change of shape or quality. The conditions depend the type of the organic resin, but the integral mold can be obtained by the conditions of temperatures of from 80 to 180° C. and in times of from 0.2 to 30 minutes.

The silicone rubber obtained from the silicone rubber composition described above typically has a Shore A hardness (durometer) of not more than 80 or alternatively not more than 60.

The composite of the present invention comprises a silicone rubber obtained by curing the silicone rubber composition described above and an organic resin, wherein the silicone rubber adheres to the organic resin.

Examples of organic resins include copolymers of acrylonitrile-butadiene-styrene, polyphenylene/styrene blends, polystyrenes, polycarbonates, polyurethanes, polyethylenes, polypropylenes, polyacrylates, polymethacrylates, polyacrylamides, polyesters, polyethylene terephthalates, polybutylene terephthalates, polyphenylene oxides, polyphenylene sulfides, polysulfones, nylons, polyamides, polyimides, fluoropolymers, liquid crystal resins, polyetherimides, phenolic resins, epoxy resins, urea resins, melamine resins, alkyd resins, and derivatives of all those organic resins.

Such composite include those constructions where the silicone rubber and the organic resin are used as an integral component. Exemplary of such composite include mobile phone, mobile telecommunications equipment, gaming machine, clocks, image receiver, DVD equipment, MD equipment, CD equipment, precision electronic equipment, electrical insulators, single-wire seals, microwave oven, refrigerator, electric rice cooker, cathode ray TV, thin displays of liquid crystal TV and plasma TV, various home appliance, copying machine, printer, facsimile machine, OA equipment, connector seal, spark plug cap, components of various sensors, automobile components, sports products, diving masks, diving gears, breathing masks, ventilator bellows, balloon catheters, rubber teats, thin-walled membranes, switch covers, medical products and devices, tubing and valves, pacifiers, feeding bottle nipple, and the like.

EXAMPLES

The silicone rubber composition and the composite of the present invention will be described in detail hereinafter using Practical Examples and Comparative Examples. However, the present invention is not limited by the description of the below listed Practical Examples. Viscosities were measured at 25° C.

<Hardness of the Silicone Rubber>

2 mm thick of the silicone rubber sheets were obtained by heating the silicone rubber compositions at 120° C. for 10 minutes with 50 tons hot press. Hardness at 25° C. of the silicone rubber sheets were measured by a Shore A hardness.

<Evaluation of Adhesion>

The silicone rubber compositions were applied to the test plates, then they were placed in the preheated stainless-steel mold. Except for polyester, the test plates are molded at 120° C. for 4 minutes with 50 tons hot press. For polyester, molding condition was 100° C. for 10 minutes with 50 ton hot press. Test specimens were stored in the aging room (25° C./50% RH) over night before peel test. 90° peeling test speed at 25° C. is 50 mm/minutes. After the peel test, the percentage of the area of the silicone rubber which destroyed cohesion to the adhering area of the silicone rubber was measured, and it was shown as CF (%).

Reference Example 1

The following were mixed at room temperature using a Ross® mixer: 100 parts by mass of a dimethylpolysiloxane capped at both molecular terminals with dimethylvinylsiloxy groups and having a viscosity of 40,000 mPa·s, 48 parts by mass of fumed silica having a BET specific surface area of 300 m²/g, 9 parts by mass of hexamethyldisilazane, and 3 parts by mass of water. A silicone rubber base was then prepared by heating and mixing for 1 hour at 150° C. under reduced pressure.

Practical Example 1

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 7:

<Formula 7>

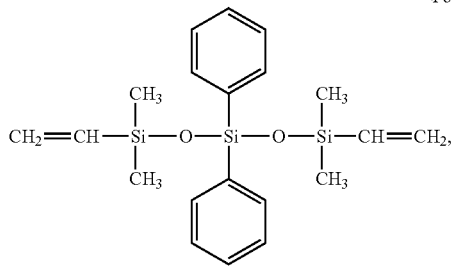

1.8 parts by mass of an organosiloxane represented by the following formula 8:

<Formula 8>

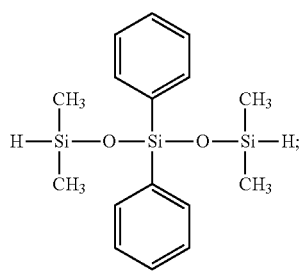

1.8 parts by mass of a diacrylic ester represented by the following formula 9:

<Formula 9>

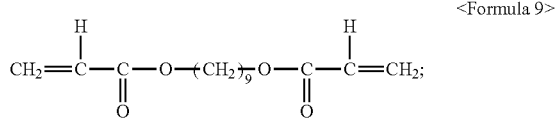

7.4 part by mass of a copolymer of dimethylsiloxane-methylhydrogensiloxane capped at both molecular terminals with trimethylsiloxy groups and having a viscosity of 43 mPa·s, wherein this quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Practical Example 2

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 10:

<Formula 10>

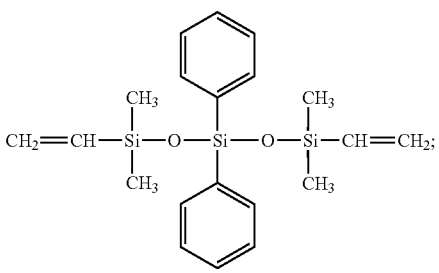

1.8 parts by mass of an organosiloxane represented by the following formula 11:

<Formula 11>

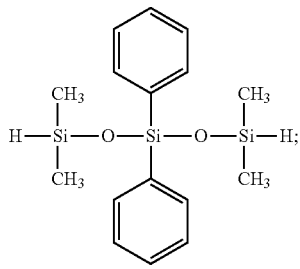

1.8 parts by mass of a diacrylic ester represented by the following formula 12:

<Formula 12>

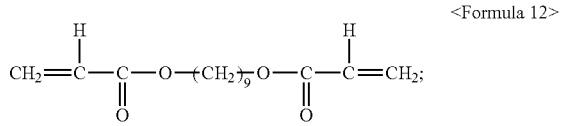

4.1 part by mass of a copolymer of dimethylsiloxane-methylhydrogensiloxane capped at both molecular terminals with trimethylsiloxy groups and having a viscosity of 43 mPa·s, 1.5 part by mass of a methylhydrogenpolysiloxane capped at both molecular terminals with trimethylsiloxy groups and having a viscosity of 20 mPa·s, wherein these quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Practical Example 3

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 13:

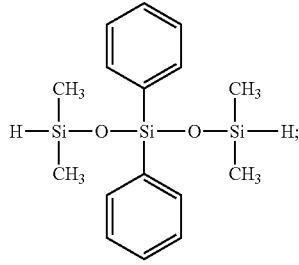

<Formula 13>

1.8 parts by mass of a diacrylic ester represented by the following formula 14:

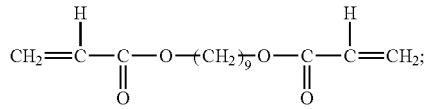

<Formula 14>

5.5 part by mass of a copolymer of dimethylsiloxane-methylhydrogensiloxane capped at both molecular terminals with trimethylsiloxy groups and having a viscosity of 43 mPa·s, wherein this quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Practical Example 4

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 15:

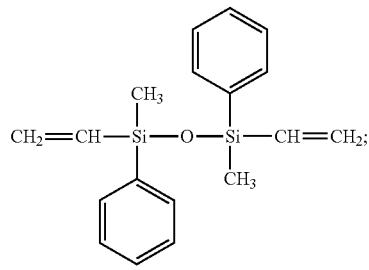

<Formula 15>

1.8 parts by mass of an organosiloxane represented by the following formula 16:

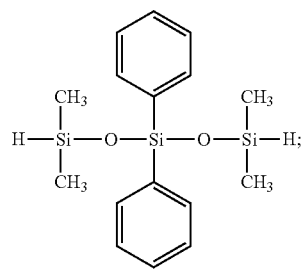

<Formula 16>

1.8 parts by mass of a diacrylic ester represented by the following formula 17:

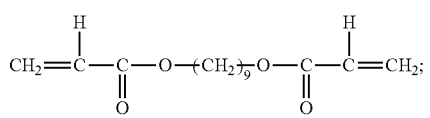

<Formula 17>

7.8 part by mass of a copolymer of dimethylsiloxane-methylhydrogensiloxane capped at both molecular terminals with trimethylsiloxy groups and having a viscosity of 43 mPa·s, wherein these quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Practical Example 5

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 18:

<Formula 18>

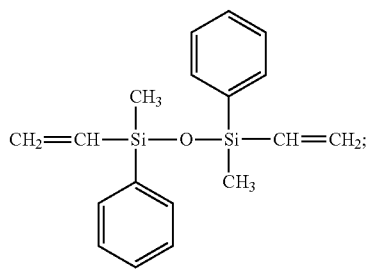

1.8 parts by mass of an organosiloxane represented by the following formula 19:

<Formula 19>

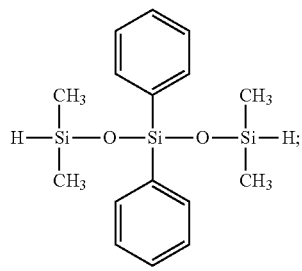

3.0 parts by mass of a tetraacrylic ester represented by the following formula 20:

<Formula 20>

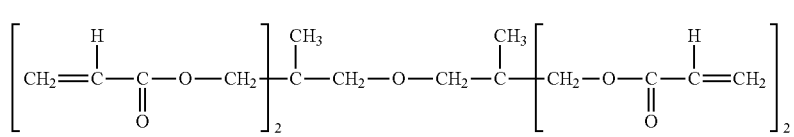

7.8 part by mass of a copolymer of dimethylsiloxane-methylhydrogensiloxane capped at both molecular terminals with trimethylsiloxy groups and having a viscosity of 43 mPa·s, wherein these quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Practical Example 6

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 21:

<Formula 21>

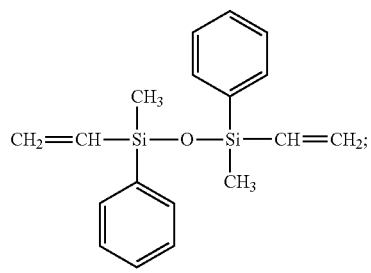

1.8 parts by mass of an organosiloxane represented by the following formula 22:

<Formula 22>

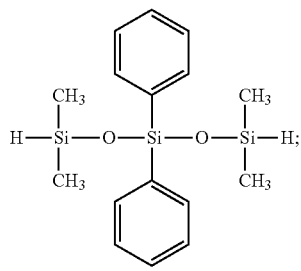

1.2 parts by mass of a tetraacrylic ester represented by the following formula 23:

<Formula 23>

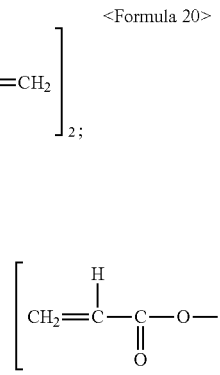

7.8 part by mass of a copolymer of dimethylsiloxane-methylhydrogensiloxane capped at both molecular terminals with trimethylsiloxy groups and having a viscosity of 43 mPa·s, wherein these quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Comparative Example 1

A silicone rubber composition was then prepared by adding the following to 180 parts by mass of the silicone rubber base prepared in Reference Example 1 and mixing to uniformity at room temperature: 1.8 parts by mass of a diacrylic ester represented by the following formula 24:

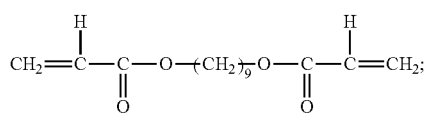

<Formula 24>

5.5 part by mass of a copolymer of dimethylsiloxane-methylhydrogensiloxane capped at both molecular terminals with trimethylsiloxy groups and having a viscosity of 5 mPa·s, wherein this quantity provided 1.2 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

Comparative Example 2

A silicone rubber composition was then prepared by adding the following to 180 parts by mass of the silicone rubber base prepared in Reference Example 1 and mixing to uniformity at room temperature: 1.8 parts by mass of an organosiloxane represented by the following formula 25:

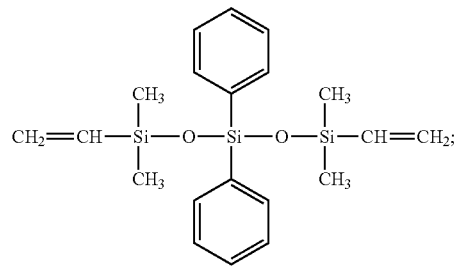

<Formula 25>

1.8 parts by mass of a diacrylic ester represented by the following formula 26:

<Formula 26>

$CH_2=C\overset{H}{\underset{\underset{O}{\|}}{-}}C-O-(CH_2)_9-O-\overset{H}{\underset{\underset{O}{\|}}{C}}-C=CH_2;$ 8.9 part by mass of a copolymer of dimethylsiloxane-methylhydrogensiloxane capped at both molecular terminals with trimethylsiloxy groups and having a viscosity of 43 mPa·s, wherein this quantity provided 1.5 moles of silicon-bonded hydrogen atoms per 1 mole of the aliphatic unsaturated bonds in this composition; 0.1 parts by mass of 1-ethynyl-cyclohexan-1-ol; and a complex between platinum and 1,3-divinyl-1,1,3,3-tetramethyldisiloxane, in a quantity that provided, in mass units, 170 ppm of platinum metal in this component with reference to this composition. The properties of the silicone rubber composition and of the silicone rubber obtained therefrom are shown in Table 1.

TABLE 1

| | | | Category | | | | | | |
|---|---|---|---|---|---|---|---|---|---|
| | | | Practical Examples | | | | | | Comparative Examples |
| Item | | | 1 | 2 | 3 | 4 | 5 | 6 | 1 | 2 |
| Viscosity (Pa · s) of Silicone Rubber Composition | | | | | | | | | | |
| at rotation speed of 1 1/s | | | 1221 | 1389 | 1405 | 1353 | 1742 | 1173 | 1500 | 1320 |
| at rotation speed of 10 1/s | | | 225.7 | 250.1 | 254.3 | 241.7 | 282.8 | 222.8 | 280.8 | 242.2 |
| Hardness of Silicon Rubber | | | 54 | 53 | 52 | 56 | 55 | 53 | 59 | 67 |
| Adhesion Properties of Silicone Rubber | | | | | | | | | | |
| Polycarbonate | Peel strength (N/mm) | | 5.2 | 13.6 | 6.3 | 7.0 | 10.9 | 13.6 | 0.7 | 0.7 |
| | CF (%) | | 100 | 100 | 100 | 100 | 100 | 100 | 0 | 0 |
| Polyester | Peel strength (N/mm) | | 6.3 | 9.9 | 8.0 | 6.7 | 8.4 | 12.8 | 2.9 | 0.9 |
| | CF (%) | | 100 | 100 | 100 | 100 | 100 | 100 | 25 | 0 |
| Polyamide | Peel strength (N/mm) | | 4.5 | 8.2 | 0.7 | 5.5 | 6.4 | 10.3 | 14.6 | 1.8 |
| | CF (%) | | 100 | 100 | 0 | 100 | 100 | 100 | 100 | 0 |

TABLE 1-continued

| | | Category | | | | | | | |
|---|---|---|---|---|---|---|---|---|---|
| | | Practical Examples | | | | | | Comparative Examples | |
| Item | | 1 | 2 | 3 | 4 | 5 | 6 | 1 | 2 |
| Carbon Steel | Peel strength (N/mm) | 0.2 | 0.7 | 0.3 | 0.5 | 0.1 | 0.3 | —* | —* |
| | CF (%) | 0 | 0 | 0 | 0 | 0 | 0 | 0 | 0 |

*unmeasurable because of peeling

INDUSTRIAL APPLICABILITY

Since the silicone rubber composition of the present invention exhibits excellent adhesive properties with respect to diverse organic resins it comes into contact with during its cure, while at the same time possesses excellent mold-release properties with respect to metal dies used for its molding, the silicone rubber composition is useful for a moldable silicone rubber composition.

The invention claimed is:

1. A silicone rubber composition comprising:
   (A) 100 parts by mass of an organopolysiloxane having at least two alkenyl groups in a molecule and free of an aryl group;
   (B) 0.1 to 5 parts by mass of (B-1) an organosiloxane having in a molecule at least one silicon-bonded aryl group, at least one silicon-bonded hydrogen atom, and free of an alkenyl group, or a mixture of component (B-1) and (B-2) an organosiloxane having in a molecule at least one aryl group and at least one alkenyl group;
   (C) 0.1 to 5 parts by mass of an acrylic or a methacrylic compound;
   (D) an organopolysiloxane having at least two silicon-bonded hydrogen atoms in a molecule and free of an aryl group and an alkenyl group, in an amount such that a mole ratio of silicon-bonded hydrogen atoms per 1 mole of total aliphatic unsaturated bonds in the silicone rubber composition is 0.5 to 5; and
   (E) a catalytically effective amount of a hydrosilylation reaction catalyst.

2. The silicone rubber composition according to claim 1, wherein component (B-1) is an organosiloxane represented by the following general formula 1:

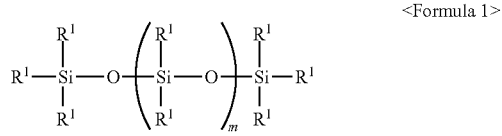
<Formula 1> wherein, each $R^1$ is independently a hydrogen atom, an alkyl group with 1 to 12 carbons or an aryl group with 6 to 12 carbons, with the proviso that at least one $R^1$ is a hydrogen atom, and at least one $R^1$ is an aryl group with 6 to 12 carbons; and m is an integer of 1 to 20.

3. The silicone rubber composition according to claim 1, wherein component (B) is a mixture of component (B-1) and (B-2) and component (B-2) is an organosiloxane represented by the following general formula 2:

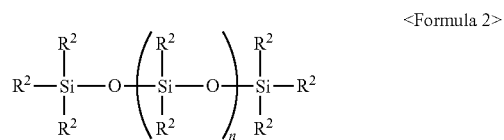
<Formula 2> wherein, each $R^2$ is independently an alkenyl group with 2 to 12 carbons, an alkyl group with 1 to 12 carbons or an aryl group with 6 to 12 carbons, with the proviso that at least one $R^2$ is an alkenyl group with 2 to 12 carbons and at least one $R^2$ is an aryl group with 6 to 12 carbons; and n is an integer of 0 to 20.

4. The silicone rubber composition according to claim 1, wherein component (B) is a mixture of components (B-1) and (B-2) in an amount such that a mass ratio of component (B-1):component (B-2) is in a range of from 1:10 to 10:1.

5. The silicone rubber composition according to claim 1, wherein component (C) is an acrylic compound or a methacrylic compound having ester bonding in its molecule.

6. The silicone rubber composition according to claim 1, wherein component (C) is an acrylic compound or a methacrylic compound selected from compounds represented by the following general formulae 3, 4, 5 and/or 6:

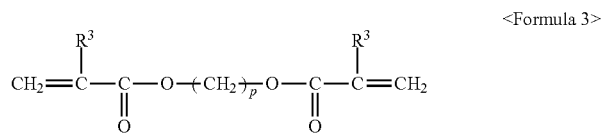
<Formula 3>

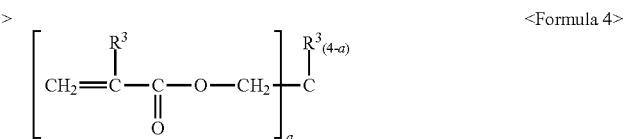
<Formula 4>

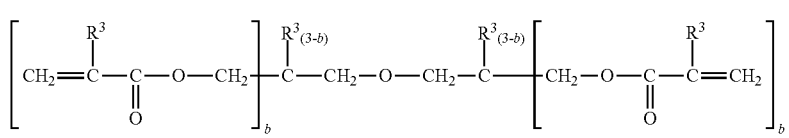
<Formula 5>

<Formula 6>

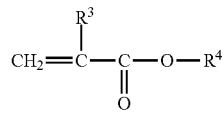

wherein, each $R^3$ is independently a hydrogen atom or a methyl group; $R^4$ is an aralkyl group with 7 to 20 carbons, a phenoxyalkyl group, or a phenoxyhydroxyalkyl group; a is an integer of 1 to 4; each b is independently an integer of 1 to 3; and p is an integer of 4 to 12.

7. A composite comprising a silicone rubber obtained by curing the silicone rubber composition according to claim 1 and an organic resin, wherein the silicone rubber adheres to the organic resin.

8. The composite according to claim 7, where the organic resin is at least one organic resin selected from copolymers of acrylonitrile-butadiene-styrene, polyphenylene/styrene blends, polystyrenes, polycarbonates, polyurethanes, polyethylenes, polypropylenes, polyacrylates, polymethacrylates, polyacrylamides, polyesters, polyethylene terephthalates, polybutylene terephthalates, polyphenylene oxides, polyphenylene sulfides, polysulfones, nylons, polyamides, polyimides, fluoropolymers, liquid crystal resins, polyetherimides, phenolic resins, epoxy resins, urea resins, melamine resins, or alkyd resins.

9. The silicone rubber composition according to claim 2, wherein component (B) is a mixture of component (B-1) and (B-2) and component (B-2) is an organosiloxane represented by the following general formula 2:

<Formula 2>

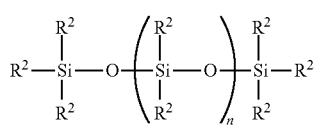

wherein, each $R^2$ is independently an alkenyl group with 2 to 12 carbons, an alkyl group with 1 to 12 carbons or an aryl group with 6 to 12 carbons, with the proviso that at least one $R^2$ is an alkenyl group with 2 to 12 carbons and at least one $R^2$ is an aryl group with 6 to 12 carbons; and n is an integer of 0 to 20.

10. The silicone rubber composition according to claim 9, wherein component (B) is a mixture of components (B-1) and (B-2) in an amount such that a mass ratio of component (B-1):component (B-2) is in a range of from 1:10 to 10:1.

11. The silicone rubber composition according to claim 9, wherein component (C) is an acrylic compound or a methacrylic compound having ester bonding in its molecule.

12. The silicone rubber composition according to claim 9, wherein component (C) is an acrylic compound or a methacrylic compound selected from compounds represented by the following general formulae 3, 4, 5 and/or 6:

<Formula 3>

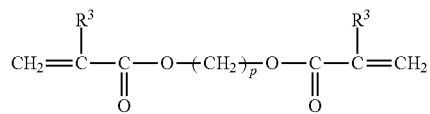

<Formula 4>

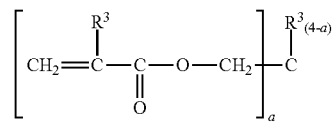

<Formula 5>

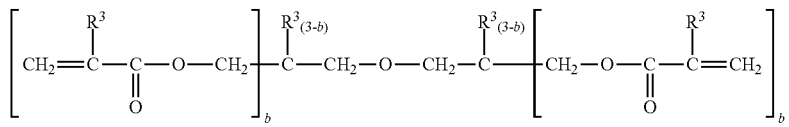

<Formula 6>

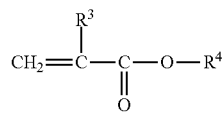

wherein, each $R^3$ is independently a hydrogen atom or a methyl group; $R^4$ is an aralkyl group with 7 to 20 carbons, a phenoxyalkyl group, or a phenoxyhydroxyalkyl group; a is an integer of 1 to 4; each b is independently an integer of 1 to 3; and p is an integer of 4 to 12.

13. The silicone rubber composition according to claim 2, wherein component (C) is an acrylic compound or a methacrylic compound having ester bonding in its molecule.

14. The silicone rubber composition according to claim 2, wherein component (C) is an acrylic compound or a methacrylic compound selected from compounds represented by the following general formulae 3, 4, 5 and/or 6:

<Formula 3>
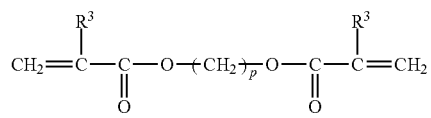
<Formula 4>
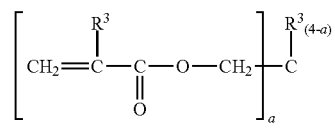
<Formula 5>
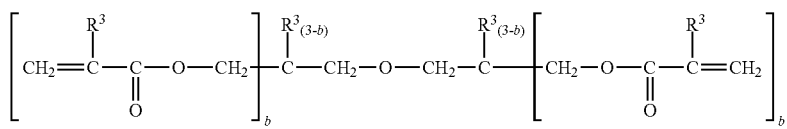
<Formula 6>
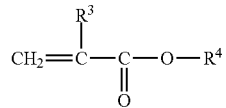
wherein, each $R^3$ is independently a hydrogen atom or a methyl group; $R^4$ is an aralkyl group with 7 to 20 carbons, a phenoxyalkyl group, or a phenoxyhydroxyalkyl group; a is an integer of 1 to 4; each b is independently an integer of 1 to 3; and p is an integer of 4 to 12.
* * * * *